United States Patent [19]

Shaffer

[11] 4,266,137
[45] May 5, 1981

[54] CERIUM ACTIVATED YTTRIUM GADOLINIUM PHOSPHATE X-RAY PHOSPHORS, PROCESS FOR PRODUCING SAME, AN X-RAY INTENSIFYING SCREEN EMPLOYING SAME

[75] Inventor: Francis N. Shaffer, Towanda, Pa.

[73] Assignee: GTE Products Corporation, Stamford, Conn.

[21] Appl. No.: 815,548

[22] Filed: Jul. 14, 1977

Related U.S. Application Data

[63] Continuation-in-part of Ser. No. 673,255, Apr. 2, 1976.

[51] Int. Cl.$^3$ .............................................. G01J 1/58
[52] U.S. Cl. ............................. 250/483; 252/301.4 P
[58] Field of Search .................. 250/483; 252/301.4 P

[56] References Cited

U.S. PATENT DOCUMENTS

| 3,322,681 | 5/1967 | Smith ............................... 252/301.4 |
| 3,322,682 | 5/1967 | Thompson ..................... 252/301.4 R |
| 3,925,674 | 12/1975 | D'Silva ................................. 250/483 |

OTHER PUBLICATIONS

"Phosphors Based on Rare Earth Phosphates—", by R. C. Rapp, J. Electrochemical Society: Solid State Science, May 1968, pp. 531–535.

"X-ray Excited Optical Fluorescense of—", by D'Silva & Fassel, Analytical Chemistry, vol. 45, No. 3, Mar. 1973, pp. 542–547.

Fluorescent & Other Gaseous Discharge Lamps, by Forsythe & Adams, Murray Hill Books (1949), pp. 46–50.

Primary Examiner—Harold A. Dixon
Attorney, Agent, or Firm—John C. Fox

[57] ABSTRACT

Cerium-activated yttrium gadolinium phosphate x-ray phosphors having a particle size of from about 4 to about 12 micrometers are prepared by solid state reaction techniques and followed by a firing in a reducing atmosphere to insure the cerium activator is in the plus 3 valence state. The x-ray phosphors can be represented by the formula $Y_{1-a}Gd_aCe_xPO_4$ wherein a is a value between about 0.05 and about 0.3 and x is a value between about 0.005 and 0.25. The foregoing phosphors under x-ray excitation have a main band peak emission of about 355 nanometers and a main band width of about 15 nanometers. The x-ray screens employing the phosphors are conventional screens wherein the phosphor is disclosed upon a substrate which is suitable for x-ray intensifying screens.

1 Claim, 2 Drawing Figures

16-$Y_{0.8}Gd_{0.2}PO_4$ · 0.05 Ce (4.5μ)
14-$Y_{0.9}Gd_{0.1}PO_4$ · 0.05 Ce (4.4μ)
12-$Y_{0.95}Gd_{0.05}PO_4$ · 0.05 Ce (4.4μ)
10-$YPO_4$ · 0.05 Ce (4.4μ)

CERIUM ACTIVATED YTTRIUM GADOLINIUM PHOSPHATE X-RAY PHOSPHORS, PROCESS FOR PRODUCING SAME, AN X-RAY INTENSIFYING SCREEN EMPLOYING SAME

This application is a continuation-in-part of Ser. No. 673,255, 4/2/76.

BACKGROUND OF THE INVENTION

1. Field of the Invention

This invention pertains to x-ray phosphors. More particularly it relates to cerium-activated yttrium gadolinium phosphors.

2. Prior Art

Calcium tungstate has been used as a phosphor for x-ray intensifying screens for many years. Until recently no other x-ray phosphor has gained acceptance. Within the past two years, however, various terbium activated rare earth oxysulfides have been used. These new phosphors while brighter than calcium tungstate yield a green emission and they necessitate to achieve the maximum benefit, a green sensitive film. The film most prevalent in usage for x-ray usage is blue sensitive film.

Cerium-activated yttrium phosphate and cerium-activated gadolinium phosphate and the mixtures thereof are disposed as photoluminescent and cathodoluminescent materials by Ropp in the *Journal of Electrochemical Society*, Vol. 115, No. 5, 1968. Cerium-activated yttrium-phosphate was disclosed as being much brighter than cerium-activated gadolinium phosphate when excited by 3020 angstroms, 2910 angstroms, and 2610 angstroms wavelengths of excitation media. Cerium-activated gadolinium phosphate is disclosed as being about 10% as efficient as cerium-activated yttrium phosphate. All mixtures of the two materials have less brightness than cerium-activated yttrium phosphate. Furthermore, the materials were prepared by precipitating the phosphates from an aqueous solution. Such a process would not yield materials that have a sufficient particle size to enable their usage for x-ray phosphors. Furthermore, there is no disclosure in the article of the materials being excited by x-rays. It is well known in the art that all materials which are excited by the foregoing wavelengths are not necessarily luminescent when exposed to x-ray excitation media. It has been a desire on the part of the x-ray phosphor industry to achieve a material which is equivalent to calcium tungstate and would have a brightness approaching that of the rare earth oxysulfides to enable the reduction of the exposure to x-rays. Furthermore, most of the calcium tungstate which is used as an x-ray phosphor is manufactured outside of the continental limits of the United States.

It is believed therefore that it would be an advancement in the art to provide a material which yields an emission in the desired blue wavelength and is at least equivalent to calcium tungstate.

OBJECTS AND SUMMARY OF THE INVENTION

It is an object of this invention to provide a new x-ray phosphor.

It is a further object to provide an x-ray material which is equivalent to calcium tungstate and yields a blue emission.

It is still another object of this invention to provide a process for producing cerium-activated yttrium gadolinium phosphate x-ray phosphors which have a particle size that enable their usage as an x-ray phosphor.

It is still another object of this invention to provide an x-ray intensifying screen which is equivalent to an x-ray intensifying screen that is used in conjunction with blue sensitive film.

These and other objects of the invention are achieved in one embodiment wherein an x-ray phosphor having the formula $Y_{1-a}Gd_1 Ce_xPO_4$ wherein a is a value between about 0.05 and about 0.3 and x is a value between about 0.005 and 0.25 having a particle size of from about 4 to about 12 micrometers a main band peak emission of 355 nanometers and a main band width of about 15 nanometers.

In another embodiment of this invention there is provided a process which utilizes solid state reaction techniques in order to produce the phosphor as described above.

In still another embodiment of this invention the phosphor as described above is employed in an x-ray intensifying screen.

DETAILS OF THE PREFERRED EMBODIMENTS

For a better understanding of the present invention, together with other and further objects, advantages, and capabilities thereof, reference is made to the following disclosure and appended claims in connection with the above-described drawings.

It is believed that it would be unexpected that a cerium-activated mixed crystal yttrium gadolinium phosphate when excited by x-rays would be brighter than cerium-activated yttrium phosphate in light of the Ropp article, which found that brightness of emission of mixtures of yttrium and gadolinium when exposed to other excitation media were reduced in the present invention. However, cerium-activated yttrium phosphate has only 80% of the brightness of calcium tungstate whereas mixtures of this invention are equivalent to or exceed calcium tungstate in brightness. Their relative brightnesses were determined by incorporating them into x-ray screens and measuring their brightness relative to a DuPont PAR X-ray screen, a standard screen prepared using the best available calcium tungstate, a technique widely accepted by phosphor and screen manufacturers for the evaluation of new x-ray phosphor materials.

Figure 1:
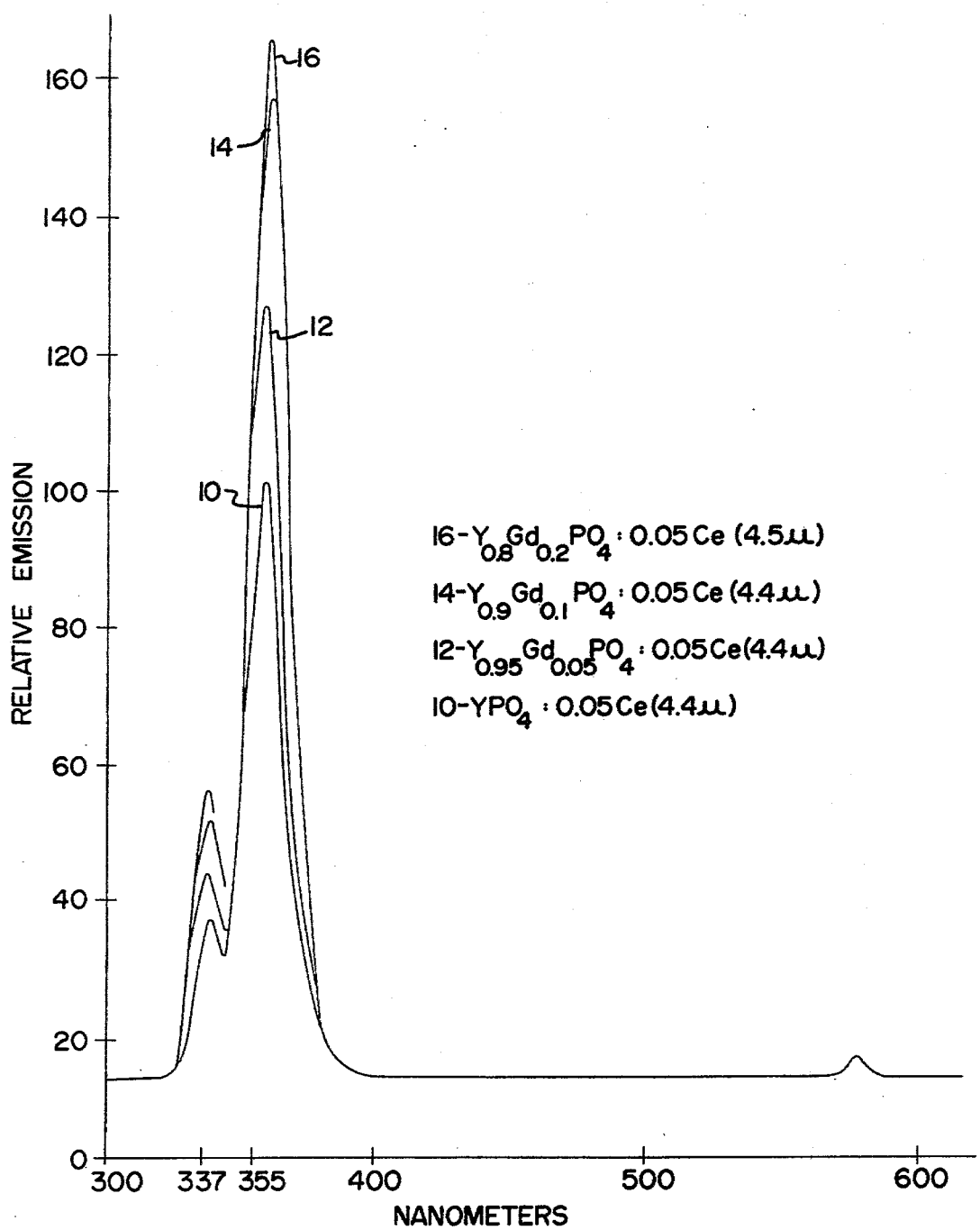
FIG. 1 is the emission curve of various phosphors of the subject invention.

Data in FIG. 1 show the effect on emission intensity due to varying Gd in the range 0–20 m/o on x-ray excited power cells of $Y_{1-a}Gd_aPO_4:0.05$ Ce. Increased particle size is known to produce increased powder cell emission intensity under x-ray excitation. Since the four samples of FIG. 1, are all at essentially the same particle size the increased Gd content is shown to increase the emission intensity.

In the process of this invention mono or diammonium orthophosphate is reacted, in a non-aqueous media, with the appropriate amounts of reactive souce of cerium, yttrium, and gadolinium. The raw materials used are all solids at room temperature and are blended to form a relatively uniform admixture which is then heated to above about 500° C. to about 1000° C. in order to form an initial reaction mass. The reaction mass is thereafter mixed with an appropriate flux such as sodium pyrophosphate and heated to about 1100° C. to about 1400° C.

While oxides are the preferred sources of yttrium and gadolinium any sources which contain a cation that is replaced by a phosphate at about 500° C. and that will either be removed as a volatile material or as a water soluble can be used. Typical yttrium and gadolinium sources that are useful include the oxalates, acetates, carbonates, and the like. Other satisfactory materials will be apparent to one skilled in the art.

The respective amounts of yttrium and gadolinium sources used are in direct relationship to the levels in the desired end product. Thus the atomic ratio of Y:Gd in the raw materials varies from about 7:3 to 95:5, with ratios of from about 9:1 to about 8:2 being preferred. Similarly, the amount of cerium is also varied to obtain a level of cerium which will yield an atomic ratio of Ce:Y and Gd of from about 0.005:1 to about 0.25:1, with ratios from about 0.02:1 to about 0.08:1 being preferred. Cerium sources utilized are similar to the sources that are used for yttrium and gadolinium. Thus certain oxide, oxalate, carbonate, and acetate can be used. Under the process conditions used, the cerium is incorporated into the host in the trivalent state.

The ammonium phosphate is added in excess of the stochiometric amount required to form yttrium-gadolinium phosphate. Thus the Y and Gd:$PO_4$ atomic ratio is at least 1:1.02 and generally is up to about 1:1.10. Although larger amounts can be used because the unreacted ammonium orthophosphate is removed during the subsequent washing steps, a ratio of much greater than 1:1.25 is wasteful of raw materials hence are not preferred.

The process of this invention in the first step thus comprises forming a relatively uniform admixture of a yttrium source, a gadolinium source, a cerium source and monoammonium orthophosphate or diammonium orthophosphate wherein the admixture the atomic ratio of Y:Gd is from about 7:3 to about 95:5, the Ce:Y and Gd atomic ratio is from about 0.005:1 to about 0.25:1 and wherein the Y and Gd:$PO_4$ atomic ratio from about 1:1.02 to about 1:1.25. Thereafter the relatively uniform admixture is heated in an initial heating step to at least 800° C. and preferably to about 900° C. although temperatures up to about 1000° C. can be used. After raising the temperature to above about 900° C. in about 1.5 to about 2 hours, the temperature is maintained at about 900° C. to about 950° C. for about 30 minutes to 1 hour. Thereafter, the initially heated material is cooled to about 200° C. at a cooling rate of from about 40° C./hour to about 50° C./hour. After cooling the heated material is blended with a suitable flux such as sodium pyrophosphate. About 5 to 10% of the weight of the original raw material is generally used as a flux.

After the flux is added the material is heated during a second heating step to about 1100° C. to about 1400° C. for a period of from about 2-4 hours. The material after the second heating step is then treated by heating the material in a water-nitric acid solution to form finely divided solids which are then separated from the aqueous nitric acid solution. Thereafter, the solids are washed with deionized water and dried.

The dried material is heated during a third heating step to about 1150° C. to about 1200° C. for about 1 to 2 hours in a hydrogen-nitrogen atmosphere. While the type of atmosphere during the first and second heating steps is not crucial, the above reducing atmosphere during the final or third heating step is essential to insure that the cerium is in the trivalent or $Ce^{+3}$ state. Generally a hydrogen nitrogen mixture containing from about 2 to 8% hydrogen is satisfactory.

Figure 2:
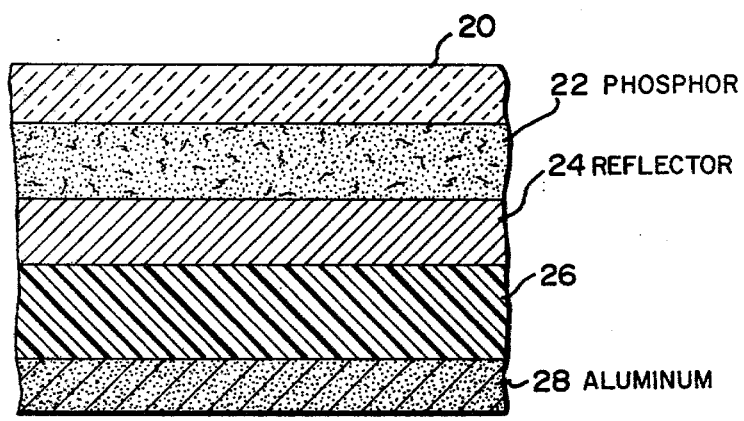
FIG. 2 is an x-ray intensifying screen of the present invention.

With particular reference to FIG. 2, there is shown a cross-sectional view of an x-ray screen of this invention. With more particularity, the x-ray screen depicted is a five layer composite. The upper layer 20 is a thin protective coating which is transparent to visible light and x-rays such as a clear plastic. The phosphors of this invention namely cerium activated yttrium gadolinium phosphate form a layer 22 below the thin protective coating 20. A first optional light reflecting layer 24 such as a dispersion of titanium dioxide in a suitable binder constitutes a covering over base 26 which is transparent to x-rays but generally opaque or translucent to visible light such as paper, cellulose acetate, polystyrene, and polymethacrylate can be used as the base. A means, not shown, for retaining the phosphor layer on the base 26 or the optional light reflecting layer 24 is used which is normally a binder transparent to both x-rays and visible light. A second optional layer 28 on the opposing side of base 26 is to reflect visible light such as aluminum or a resin containing aluminum particles. The optional layer 28 is used when the base 26 is not completely opaque to visible light.

EXAMPLE I

About 22.6 parts of yttrium oxide, $Y_2O_3$; about 9 parts of gadolinium oxide, $Gd_2O_3$; about 4.4 parts of cerium oxalate, $Ce_2(C_2O_4)_3 \cdot 9 H_2O$, and about 31 parts of ammonium dihydrogen phosphate, $NH_4H_2PO_4$, are dry blended at room temperature. The blended material is placed into an electric furnace at about 500° C. and gradually heated to about 900° C. over a period of about 1.75 hours. About one-half hour later, the electric energy to the furnace is shut off and the furnace with the material allowed to slowly cool for about 16 hours to about 200° C. before removal from the furnace to cool. The material is then mortared to a powder and placed in a mill about 5.0 parts of sodium pyrophosphate $Na_4P_2O_7 \cdot 10 H_2O$ is added as a flux. The material with flux is blended briefly and refired again for about 1.5 hours at 1000° C., gradually increased to about 1300° C. and held at about 1.5 hours additional time at 1300° C. and then removed from the furnace to cool.

When cool, the material, a white body-colored very hard fused mass, is reduced to a finely divided crystalline powder by the following treatment.

Agitation is set up with an electric motor driven stainless steel stirrer in a heated solution of 300 parts by volume deionized water plus 100 parts by volume of nitric acid. The fused cake of fired material is added to the solution and agitation is continued for about 1 hour with the solution at high temperature after which time agitation is shut off briefly and the cake crushed. Agitation is then resumed for about one-half hour and the material rendered to a powder suspension.

The suspension at this point is allowed to stand a few minutes until the suspended powder settles at which time the clear supernatant solution is decanted off. Three hot deionized water washes are then used on the material, each of 1000 parts ot total slurry volume and stirred about 5 minutes, then settled, and the clear supernatant liquid is decanted.

The slurry after the third water wash is filtered and the filter cake then oven dried at about 120° C. to a bone-dry state and then sifted through a 60-mesh sieve. A portion of the material is then final-fired for about 1.25 hours at cycling temperature ranging from about 1150° C. to about 1180° C. in a covered container in a 5% hydrogen, nitrogen-hydrogen mixture and then cooled to near room temperature in the same atmosphere to insure that the activator be mainly in the $Ce^{+3}$ state. The material is then removed from the furnace and mortared.

While there has been shown and described what are at present considered the preferred embodiments of the invention, it will be obvious to those skilled in the art that various changes and modifications may be made therein without departing from the scope of the invention as defined by appended claims.

What is claimed is:

1. A process for producing cerium activated yttrium-gadolinium phosphate x-ray phosphor composition comprising:
   (a) forming a uniform reaction admixture of a reactive yttrium source, a reactive gadolinium source, a reactive cerium source and an ammonium orthophosphate selected from monoammonium orthophosphate and diammonium orthophosphate wherein the Y:Gd atomic ratio is from about 7:3 to about 95:5, the Ce:Y and Gd atomic ratio is from about 0.005:1 to about 0.25:1 and the Y and Gd:PO$_4$ atomic ratio is from about 1:1.02 to about 1:1.25;
   (b) conducting an initial heating step wherein the temperature of said admixture is raised from ambient temperature to at least 800° C. in a period of about 1.5 to about 2 hours and maintaining said temperature for at least about 30 minutes;
   (c) cooling the heated material to ambient temperature:
   (d) adding from about 5 to about 10% by weight of the original raw materials of a flux to said heated mixture and forming a relatively uniform admixture of said heated mixture and flux;
   (e) heating the flux containing admixture to about 1100° C. to about 1400° C. for about 2 to 4 hours;
   (f) adding the resulting heated material to a water-nitric acid solution and agitating sufficiently to form finely divided solids;
   (g) separating said solids from said acid solution and washing said solids with water and drying said washed solids sufficiently to remove the water; and
   (h) heating said dried solids in a reducing atmosphere at a temperature of from about 1150° C. to about 1200° C. for about 1 to 2 hours.

* * * * *